United States Patent
Wedeen

Patent Number: 5,350,989
Date of Patent: Sep. 27, 1994

[54] TORQUE OSCILLATION COMPENSATION UTILIZING BATTERY CURRENT SENSING

[75] Inventor: Robert S. Wedeen, Manhattan Beach, Calif.

[73] Assignee: Hughes Aircraft Company, Los Angeles, Calif.

[21] Appl. No.: 61,413

[22] Filed: May 13, 1993

[51] Int. Cl.$^5$ .............................................. G05B 5/00
[52] U.S. Cl. ................... 318/632; 318/629; 318/432
[58] Field of Search ............... 318/696, 801, 808, 805, 318/700, 629, 602, 800, 807, 632, 633, 432, 611, 623; 388/820, 819, 809, 812, 815, 930

[56] References Cited

U.S. PATENT DOCUMENTS

| | | | |
|---|---|---|---|
| 4,207,610 | 6/1980 | Gordon | 364/424.04 |
| 4,240,020 | 12/1980 | Okuyama et al. | 318/800 |
| 4,266,176 | 5/1981 | Fulton | 318/801 |
| 4,269,073 | 5/1981 | McIntyre | 318/714 |
| 4,298,831 | 11/1981 | Espelage et al. | 318/808 |
| 4,355,274 | 10/1982 | Bourbeau | 318/805 |
| 4,445,080 | 4/1984 | Curtiss | 318/807 |
| 4,567,409 | 1/1986 | Ogawa | 388/820 |
| 4,661,756 | 4/1987 | Murphy et al. | 318/700 |
| 4,884,016 | 11/1989 | Arello | 318/696 |
| 4,978,894 | 12/1990 | Takahara | 318/811 |
| 5,122,719 | 6/1992 | Bessenyei et al. | 318/602 |
| 5,184,057 | 2/1993 | Sakai et al. | 318/801 |

Primary Examiner—William M. Shoop, Jr.
Assistant Examiner—John W. Cabeca
Attorney, Agent, or Firm—L. A. Alkov; W. K. Denson-Low

[57] ABSTRACT

A torque oscillation compensation system and circuit that senses battery current to compensate for electrical motor torque pulsations. An input source provides a torque/current command input signal that drives the motor, and a summing device has one input coupled to receive the torque/current command input signal. A controller is coupled to the summing device and to power switching circuitry that is coupled between the battery and the electric motor. An oscillation compensation circuit is coupled between the battery and the summing device that generates a compensation signal that is combined with the torque/current command input signal and compensates for output shaft oscillators. The oscillation compensation circuit comprises an AC coupling capacitor, an amplifier having a predetermined transfer function that is designed to provide for the proper amount of compensation. The present invention compensates for the torque fluctuations caused by induction motors and permits stable operation thereof. The novelty of the present invention is that compensation is achieved by sensing the AC ripple component of the battery or DC power supply input to power switching circuitry used to drive the motor. This signal is an indication of torque fluctuation and is used to to modulate the motor current and/or motor slip and/or commutating angle and/or the motor field current to eliminate the torque fluctuations of the motor output shaft.

8 Claims, 3 Drawing Sheets

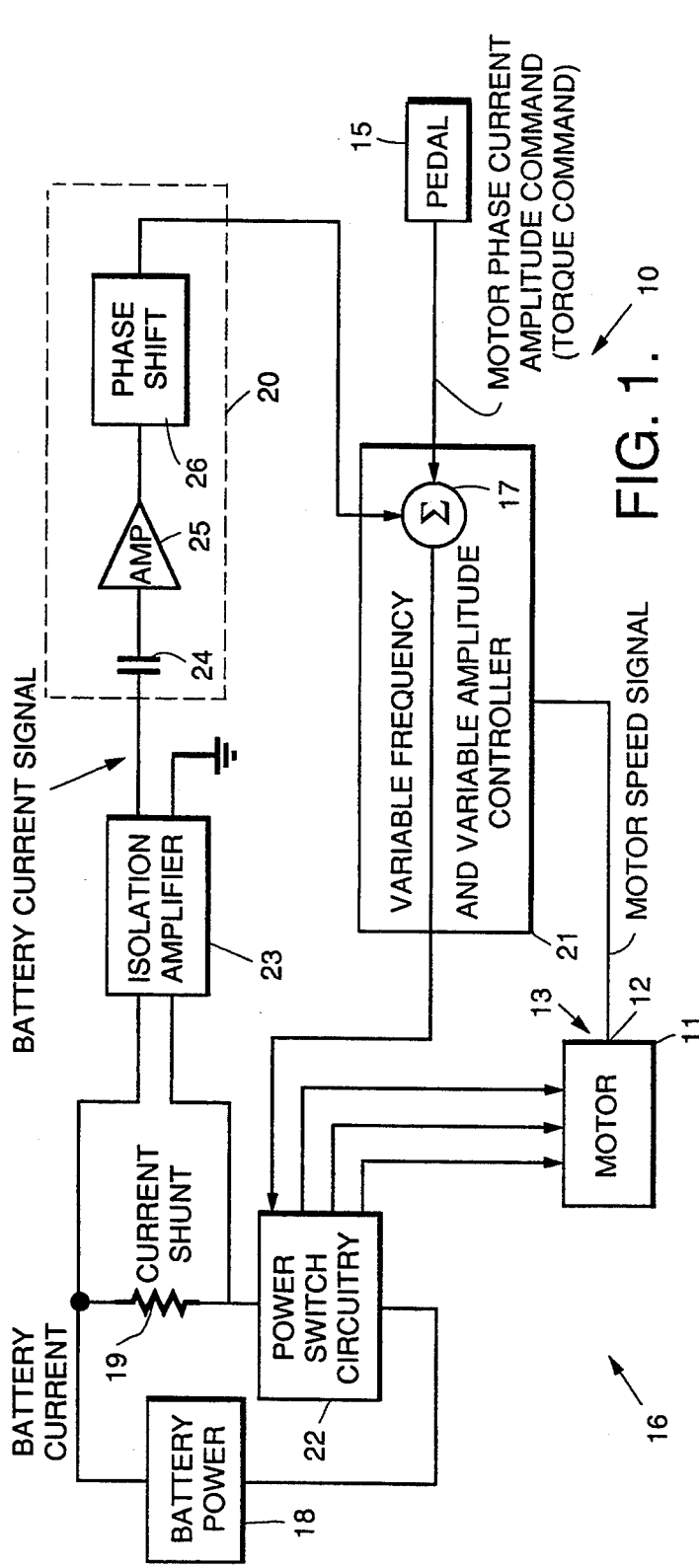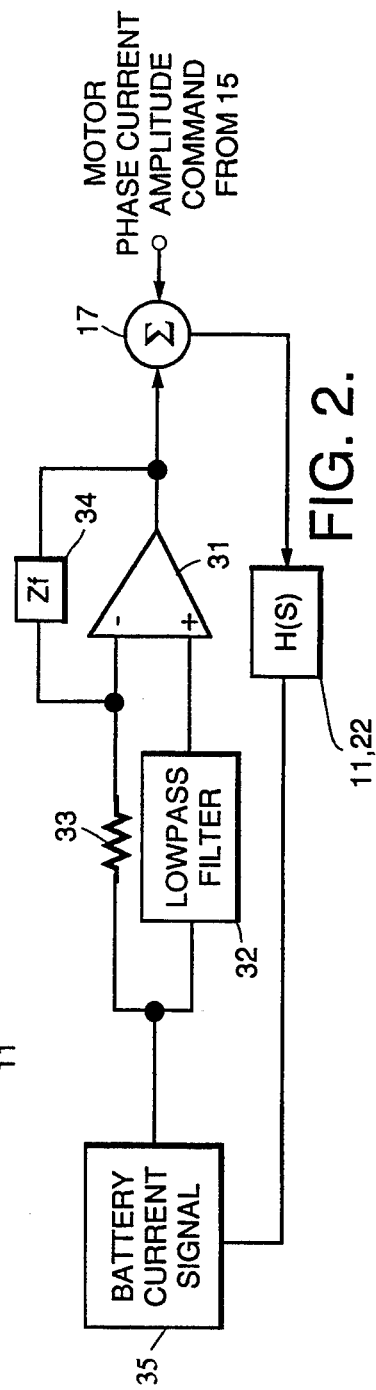
FIG. 1.
FIG. 2.

TORQUE OSCILLATION COMPENSATION UTILIZING BATTERY CURRENT SENSING

BACKGROUND

The present invention relates generally to torque oscillation compensation for electric motors, and more particularly, to a torque oscillation compensation system and circuit that senses battery current to generate a compensation signal.

Electric drive train systems can exhibit torque pulsations. These torque pulsations can cause motor bearing and tire wear. The torque pulsations can also cause undesirable drive train/vehicle vibration. Prior art devices for use in stabilizing electric vehicles have attempted to implement vehicle stabilization using gyroscopic compensation. However, gyroscopic techniques have not yet proved to be feasible for use on electric vehicles. Other conventional approaches include in-line torque transducer feedback, DC bus voltage modulation, and external series/parallel element for motor, and the like.

It has also been known for some time that induction motors that are driven by variable frequency controllers exhibit torque fluctuations, especially at low speed. Electric vehicles that are propelled by such induction motors therefore exhibit torque fluctuations. This results in unstable operation at low speed and can affect the marketability of the vehicle. Consequently, the prior art approaches are not cost effective and/or technically suited for use in many electric drive train applications.

Accordingly, it is an objective of the present invention to provide for a torque oscillation compensation circuit that senses battery current to generate a compensation signal to compensate for pulsations experienced at the output shaft of an electric motor.

SUMMARY OF THE INVENTION

In order to provide for the above and other objectives, the present invention comprises a torque oscillation compensation system and circuit that uses torque feedback derived from the output shaft of an electric vehicle motor to compensate for electrical motor pulsations.

The present invention compensates for the above-described torque fluctuations caused by induction motors to permit stable operation thereby. The novelty of the present invention is that compensation is achieved by sensing the AC ripple component of the battery or DC power supply input to an inverter/controller used to drive the motor. This signal is an indication of torque fluctuation and is used to to modulate or compensate the motor current and/or motor slip and/or commutating angle and/or the motor field current to eliminate the torque fluctuations of the drive line.

The present invention eliminates the torque instability prevalent in conventional electric vehicles, thereby improving vehicle handling. The present invention is more effective and less expensive to implement compared to conventional approaches such as gyroscopic compensation, in-line torque transducer feedback, DC bus voltage modulation, external series/parallel element for motor, and the like.

The present invention is inexpensive, effective, light and extremely feasible for use in electric vehicles as well as other industrial applications, especially those applications that involve the use of an inverter/controller to drive an electric motor. Applications of this invention involve stabilizing motors that exhibit torque fluctuations at any speed and may be used in many potential commercial power control systems.

More specifically, the present invention comprises a torque oscillation compensation system for use with an electric motor that provides compensation based upon a sampling of the battery or power supply current. The system comprises an input source for providing a motor phase current amplitude command input signal, or torque/current command input signal, such as is derived from an accelerator pedal of an electric vehicle. A summing device has one input coupled to the input source for receiving the motor phase current amplitude command input signal. A controller is coupled to the output of the summing device, and power switching circuity is coupled between the controller and the electric motor. A battery current sensor is AC coupled through the appropriate transfer function (amplifier with appropriate phase shift) and is fed into a second input of the summing device. This generates a feedback compensation signal that is combined with the torque/current command input signal that compensates for oscillations present in the output shaft of the electric motor.

The present invention thus provides compensation for the torque pulsations by utilizing the AC component of a signal derived from the power source as a signal from which compensation commands are derived. This AC-coupled signal is applied to the motor controller with proper amplitude and phase shift to modulate and compensate the motor current and/or slip and/or speed and/or commutating angle and/or field current to eliminate torque fluctuations of the drive train of the vehicle.

The oscillation compensation circuit comprises a loop amplifier having a predetermined transfer function and AC coupling means coupled between the loop amplifier and the summing device. The AC coupling means typically comprises a plurality of coupling capacitors. In a specific reduced to practice embodiment of the present invention, a limiter circuit is coupled to a point between the AC coupling capacitors, which comprises first and second oppositely coupled diodes. The oscillation compensation circuit also may comprise a switching circuit coupled to the AC coupling means.

The torque oscillation compensation circuit of the present invention comprises a battery current shunt which senses battery current ripple, a summing device having an output and having one input coupled to receive a torque/current command input signal, and an oscillation compensation circuit coupled between the battery current shunt and a second input of the summing device that generates a feedback compensation signal that is combined with the torque/current command input signal that compensates for oscillations present in the output shaft of the electric motor.

In addition, several optional disabling circuits may be employed in the present compensation circuit. A first disabling circuit may be coupled to the accelerator pedal for preventing compensation beyond a predetermined point of pedal travel. A second disabling circuit may be coupled to a speed sensor coupled to the motor for preventing compensation above a predetermined speed. A third disabling circuit may be coupled to a brake/regeneration sensor coupled to the brake of the vehicle for preventing compensation during braking and/or regeneration.

Applications of the present invention include stabilizing drive trains that exhibit torque pulsations, at any speed, in motoring or regeneration and include power control systems, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a block diagram showing a torque oscillation compensation system in accordance with the principles of the present invention;

FIG. 2 shows a generic block diagram of the torque oscillation compensation system in accordance with the principles of the present invention.

DETAILED DESCRIPTION

Figure 3A:
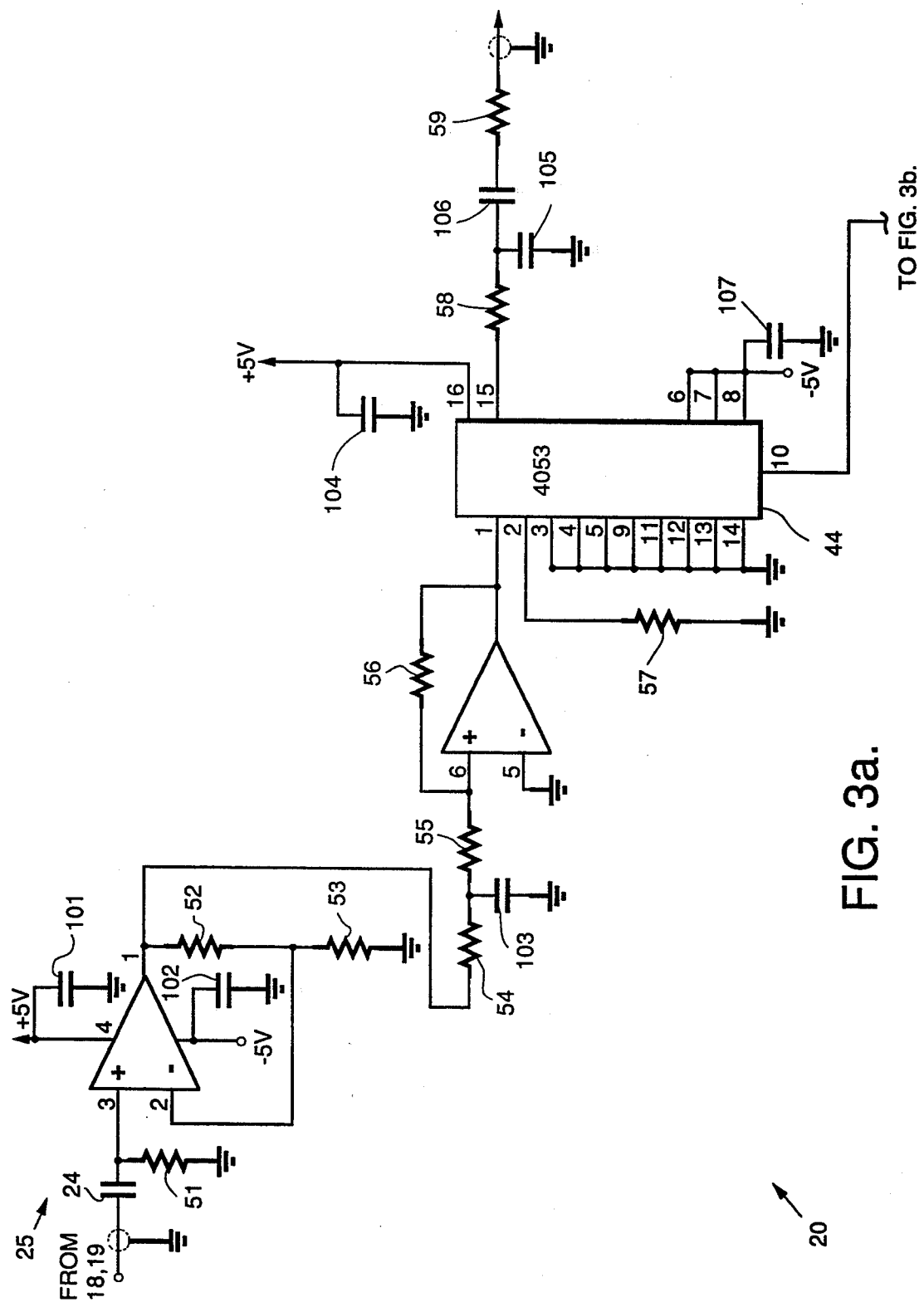
FIGS. 3a and 3b show a detailed diagram illustrating an embodiment of the torque oscillation compensation circuit of FIG. 1 that has been reduced to practice.

By way of introduction, inverters (controllers) that are used to drive motors typically derive their prime power from a battery or a DC power source. The input power to the inverter is related to the electrical load on the inverter at its output. The electrical load is related to output power at the motor drive shaft and the shaft power is proportional to torque. Therefore, torque fluctuations experienced at the motor shaft tend to produce fluctuations in the DC input current to the inverter. In the present invention, these DC current fluctuations are used to emulate the torque fluctuations. A DC link current sensor is placed either before or after an optional DC link filter. With the appropriate compensation, DC current fluctuations are used to modulate and compensate the motor current and/or motor slip and/or commutating angle and/or motor field current to eliminate the torque fluctuations of the motor drive shaft.

One embodiment of the present invention is configured as is shown in FIG. 1, along with those connections necessary to process a battery current signal and sum a compensated battery current signal with a phase current amplitude command input signal, or torque/-current command input signal. In the embodiment of FIG. 1, the phase current amplitude command input signal is derived from a vehicle accelerator pedal.

More specifically, FIG. 1 illustrates a block diagram showing a specific embodiment of a torque oscillation compensation system 10 in accordance with the principles of the present invention employed with a propulsion system of an electric vehicle 16. The torque oscillation compensation system 10 is employed with an electric motor 11 of the electric vehicle 16 and is comprised of a battery current sensor 12 that is coupled to a power supply 18 or battery 18 of the vehicle 16, for example. A torque/current command input signal that comprises a motor phase current amplitude command signal, or torque command signal, derived from an accelerator pedal 15 of the vehicle 16 is coupled by way of one input of a summing device 17 that may be part of a controller 21. The controller 21 is coupled by way of power switching circuitry 22 to the motor 11 and applies appropriate signals thereto (typically pulse width modulated drive signals) that cause the motor 11 to accelerate and decelerate and to run in forward and reverse directions.

The vehicle battery 18 or power source 18 is coupled to the power switching circuitry 22 by way of a current shunt resistor 19. An output is taken across the current shunt resistor 19 and is applied to an isolation amplifier 23. The output of the isolation amplifier 23 is coupled through a compensation circuit 20 in accordance with the present invention. The output of the compensation circuit 20 is applied to a second input of the summing device 17 and is summed with the torque command signal derived from the accelerator pedal 15. The output signal from the compensation circuit 20 compensates or modulates the torque command signal in a manner that reduces or eliminates fluctuations experienced at the drive shaft 13 of the motor 11.

The compensation circuit 20 is comprised of an AC coupling capacitor 24, an amplifier 25, and a phase shift device device 26 that implements the AC coupling of a current signal derived from the battery 18. The current output from the battery 18 includes the torque tipple experienced by the drive shaft 13 of the motor 11 and this torque ripple signal is amplified and phase shifted by the compensation circuit 20. The compensation circuit 20 provides a desired torque ripple signal which, when combined with the torque command signals derived from the accelerator pedal 15 in the summing device 17, substantially reduces or eliminates torque fluctuations experienced at the drive shaft 13 of the motor 11. The output of the summing device 17 comprises a compensated torque command signal the is applied to the motor 11 by way of the power switching circuitry 22 and which substantially reduces or eliminates torque fluctuations therein.

Undesirable torque ripple appears as an AC component of the battery current signal and is AC coupled by way of the coupling capacitor 24 to the amplifier 25. The amplifier 25 is designed to have the appropriate gain and phase shift (indicated by the phase shift device 26) that develops a signal that eliminates the torque pulsations. The compensation circuit 20 output is summed with the main torque command signal derived from the accelerator pedal 15 which modulates the motor commands to eliminate the torque pulsations.

However, the present invention is not just limited to the embodiment shown in FIG. 1 and more generally may be configured as conceptually shown in FIG. 2. The system 10 depicted in FIG. 2 functions by comparing a desired DC component of the battery current signal derived from the battery 18 with the actual battery current signal 35 that includes a derivative of the torque ripple experienced by the motor 11. An error amplifier 31 provides the appropriate gain and phase shift to stabilize the battery current to a DC level and thereby eliminate motor torque fluctuations. A low pass filter 32 produces the DC component of the battery current signal which is used as a comparison reference signal by the error amplifier 25 which compares the reference signal to the actual battery current (including ripple) that is input through an input resistor 33. The box identified as H(S) is the transfer function through the system 10 and includes the controller 21 and motor 11 which influence the battery output current. The box identified as Z(f) is an impedance 34 that is used to achieve a complex gain for the error amplifier 31 and whose value is dependent upon each particular system 10.

Figure 3B:
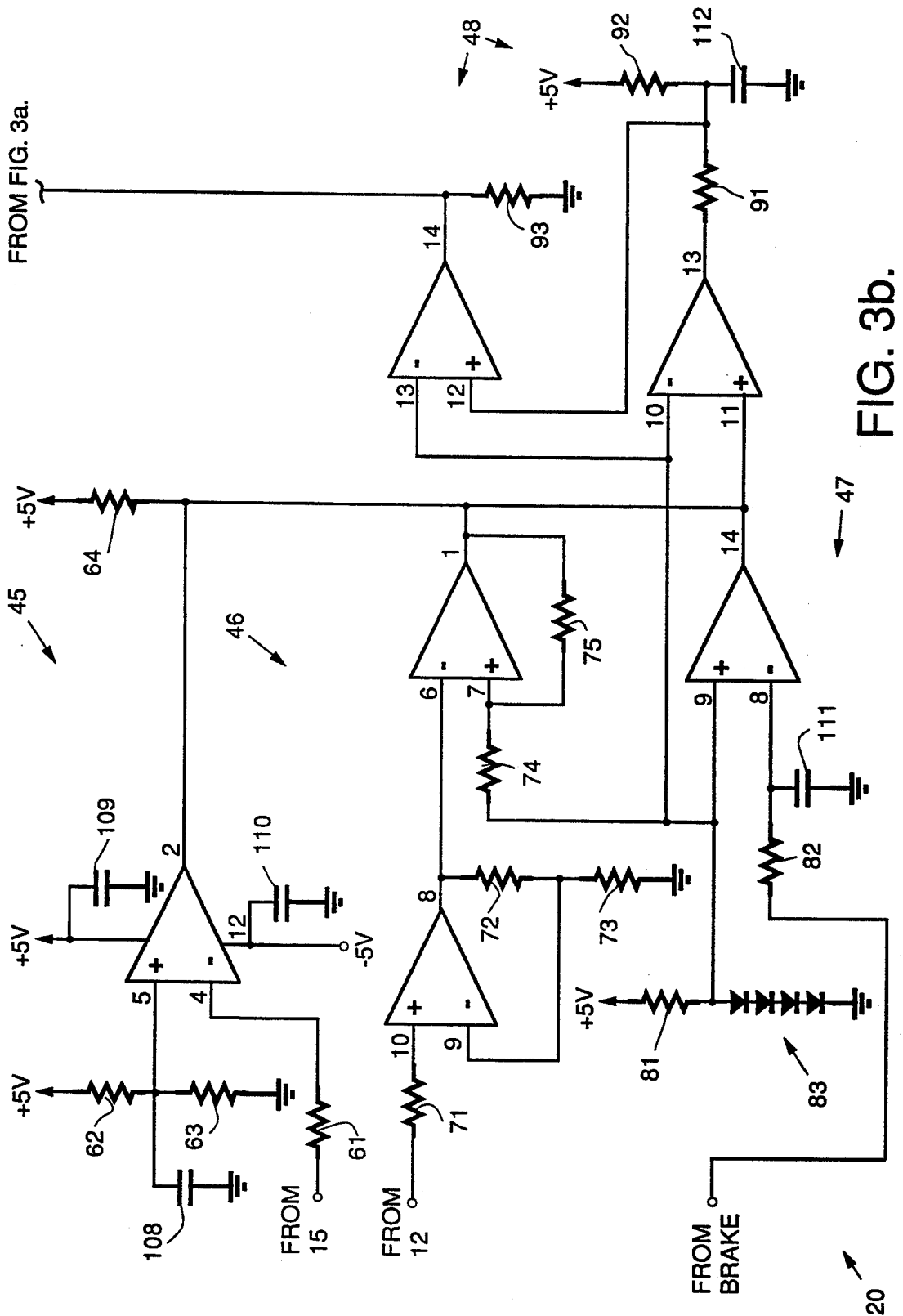

Referring to FIG. 3, comprising FIGS. 3a and 3b, it shows a detailed diagram illustrating an embodiment of compensation circuit 20 employed in the torque oscillation compensation circuit 10 shown in FIG. 1 that has been reduced to practice for use with the vehicle 16. The electrical interconnection of the circuit of FIG. 3 is as shown in the drawing and will not be described in detail. A parts list for the circuit 20 of FIG. 3 is provided hereinbelow for completeness. The compensation circuit 20 comprises a battery input 41 that is coupled by way of the AC coupling capacitor 24 to the amplifier 25. The amplifier 25 is comprised of two serially coupled amplifier circuits 42, 43. The amplifier circuits 42, 43, may each be comprised of a model 324 amplifier, manufactured by National Semiconductor, for example. The output of the second amplifier circuit 43 is coupled to a model 4053 analog multiplexer used as a switch 44, manufactured by Motorola, for example, from which the compensated output signal is provided and coupled to the summing device 17.

Three disabling circuits 45, 46, 47 are provided to enable or disable the output from the analog switch 44 depending on various operating conditions of the vehicle 16. The first disabling circuit 45 may be comprised of a model 339 amplifier manufactured by National Semiconductor, for example. The first disabling circuit 45 is coupled to the acceleration pedal 15 and is adapted to disable the circuitry, if desired, beyond a predetermined point of pedal travel, say 80%, for example. The second disabling circuit 46 may be comprised of model 324 and 339 amplifiers, for example. The second disabling circuit 46 is coupled to the speed sensor 12 and is adapted to disable the circuitry above a certain speed, if desired, and contains hysteresis for speed. The third disabling circuit 47 may be comprised of a model 339 amplifier, for example. The third disabling circuit 47 is coupled to the analog switch 44 and is adapted to disable the circuitry, if desired, when regenerating or braking the vehicle 16. An interface circuit 48 comprising a model 324 and a model 339 amplifier is coupled between each of the three disabling circuits 45, 46, 47 and the analog switch 44. The interface circuit 48 controls the operability of the analog switch 44 based upon the conditions of the various components to which the three disabling circuits 45, 46, 47 are connected. Two capacitors and two resistors are employed to set the phase shift and gain of the compensation circuit 20 and provide for negative feedback.

For the purpose of completeness, the following is a listing of the values for each of the resistors, capacitors, and diodes shown in FIG. 2: resistor 51=130 Kohm; resistor 52=82 Kohm; resistor 53=1 Kohm; resistor 54=1 Kohm; resistor 55=30 Kohm; resistor 56=30 Kohm; resistor 57=51 Kohm; resistor 58=1 Kohm; resistor 59=43 Kohm; resistor 61=5.6 Kohm; resistor 62=3 Kohm; resistor 63=12 Kohm; resistor 64=10 Kohm; resistor 71=5.6 Kohm; resistor 72=27 Kohm; resistor 73=1.3 Kohm; resistor 74=10 Kohm; resistor 75=75 Kohm; resistor 81=1 Kohm; resistor 82=5.6 Kohm; resistor 91=1 Kohm; resistor 92=180 Kohm; resistor 93=10 Kohm; capacitor 24=1 microfarads; capacitor 101=0.1 microfarads; capacitor 102=0.1 microfarads; capacitor 103=1 microfarads; capacitor 104=0.1 microfarads; capacitor 105=1 microfarads; capacitor 106=1 microfarads; capacitor 107=0.1 microfarads; capacitor 108=0.1 microfarads; capacitor 109=0.1 microfarads; capacitor 110=0.1 microfarads; capacitor 111=1 microfarads; capacitor 112=1 microfarads and diodes 83=1N4003 diodes.

Thus there has been described a new and improved torque oscillation compensation system and circuit that uses battery current ripple feedback derived from a current sensor and correlated to motor torque pulsations. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A torque oscillation compensation system for use with a power source, an electric motor and a controller coupled between the power source and the motor, said system comprising:

an input source for providing a motor phase current amplitude command input signal for causing the controller to drive the motor;

a summing device having an output and having a first input coupled to the input source for receiving the motor phase current amplitude command input signal and having an output coupled to the controller;

current sensing means coupled to the power source for sensing the current supplied by the power source;

a low pass filter coupled to the current sensing means for coupling a DC component of the current from the power source;

an error amplifier having a first input coupled to the low pass filter and having a second input coupled to the resistor and having an output coupled to a second input of the summing device and wherein the error amplifier generates a compensation signal that is combined with the motor phase current amplitude command input signal that stabilizes the current from the power source to a DC level and thus compensates for torque oscillations present in the electric motor and thereby eliminate motor torque fluctuations;

a resistor coupled to the current sensing means for coupling the current from the power source to the error amplifier;

an impedance coupled in a feedback manner between the output of the error amplifier and a selected input of the error amplifier that determines a complex gain for the error amplifier.

2. A torque oscillation compensation system for use with a power source, an electric motor having an output shaft, a controller, and power switching circuitry coupled between the power source and the motor that is controllable by the controller, said system comprising:

an input source coupled to the controller for providing a torque input signal for causing the controller to drive the motor;

a summing device having an output coupled to the controller and having one input coupled to the input source;

current sensing means for sensing the current supplied by the power source;

an isolation amplifier coupled to the current sensing means; and an oscillation compensation circuit coupled between the isolation amplifier and a second input of the summing device for generating a compensation signal that is combined with the torque command input signal that compensates for oscillation present in the output shaft of the electric motor.

3. The system of claim 2 wherein the torque oscillation compensation circuit comprises:

AC coupling means coupled to the isolation amplifier;

an amplifier for providing a predetermined phase shift coupled between the AC coupling means and the second input of the summing device.

4. The system of claim 3 wherein the AC coupling means comprises a coupling capacitor.

5. The system of claim 4 wherein the torque oscillation compensation circuit further comprises a first amplifier coupled to the coupling capacitor;

a second amplifier coupled to an output of the first amplifier;

an analog switch coupled between an output of the second amplifier and the second input of the summing device.

6. The system of claim 5 wherein in the input source comprises an accelerator pedal and wherein the system further comprises a disabling circuit coupled between the accelerator pedal and the analog switch for preventing compensation beyond a predetermined point of pedal travel.

7. The system of claim 6 that further comprises a second disabling circuit coupled between a speed sensor coupled to the motor and the analog switch for preventing compensation above a predetermined speed.

8. The system of claim 7 that further comprises a third disabling circuit coupled between a brake regeneration sensor and the analog switch for preventing compensation during brake and/or regeneration.

* * * * *